US008233241B2

(12) United States Patent
Huang et al.

(10) Patent No.: US 8,233,241 B2
(45) Date of Patent: Jul. 31, 2012

(54) POSITIONING WEIGHT ASSEMBLIES ALONG A DYNAMIC LOOP SECTION OF A FLEX CABLE TO REDUCE FLEX CABLE OSCILLATION

(75) Inventors: Fu-Ying Huang, San Jose, CA (US); Jr-Yi Shen, Sunnyvale, CA (US); Jifang Tian, Fremont, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1035 days.

(21) Appl. No.: 12/183,407

(22) Filed: Jul. 31, 2008

(65) Prior Publication Data
US 2010/0027166 A1 Feb. 4, 2010

(51) Int. Cl.
*G11B 5/55* (2006.01)
(52) U.S. Cl. ..................................... 360/264.2
(58) Field of Classification Search .............. 360/264.2
See application file for complete search history.

(56) References Cited

U.S. PATENT DOCUMENTS

| | | | |
|---|---|---|---|
| 5,739,984 A | 4/1998 | Eckberg | |
| 5,907,452 A | 5/1999 | Kan | |
| 6,836,390 B2 | 12/2004 | Shin et al. | |
| 6,937,442 B2 | 8/2005 | Zhao et al. | |
| 7,095,595 B2 * | 8/2006 | Shin | 360/266.3 |
| 7,271,345 B2 | 9/2007 | Freeman et al. | |
| 7,495,866 B2 * | 2/2009 | Izumi et al. | 360/264.2 |
| 2003/0086214 A1 * | 5/2003 | Shin | 360/266.3 |
| 2004/0264058 A1 | 12/2004 | Huynh | |
| 2007/0153415 A1 | 7/2007 | Chang et al. | |
| 2009/0141404 A1 * | 6/2009 | Kerner et al. | 360/245.8 |

FOREIGN PATENT DOCUMENTS

| | | |
|---|---|---|
| JP | 07310783 | 11/1995 |
| JP | 2004039543 | 2/2004 |

OTHER PUBLICATIONS

Chang, Jen-Yuan "Hard Disk Drive Seek-Arrival Vibration Reduction with Parametric Damped Flexible Printed Circuits", *Microsystem Technologies*, vol. 13, No. 8-10, (May 2007),1103-1106.
IP.COM, "Flex Cable With Integral Damper", IP.com (2004),1-2.

* cited by examiner

*Primary Examiner* — David D Davis

(57) ABSTRACT

A method of reducing oscillation at the read write element of a hard disk drive, is described. In one embodiment, a flex cable for conducting data signals from a head stack assembly to a connector is provided. One or more weights are then coupled with the flex cable at one or more predetermined locations. The one or more predetermined locations are selected based upon mass distribution along the flex cable.

16 Claims, 5 Drawing Sheets

POSITIONING WEIGHT ASSEMBLIES ALONG A DYNAMIC LOOP SECTION OF A FLEX CABLE TO REDUCE FLEX CABLE OSCILLATION

FIELD

The field of the present technology relates to direct access storage devices. In particular, it relates to reducing flex cable oscillation.

BACKGROUND

The hard disk drives (HDD) have become part of every day life, and as such, expectations and demands continually increase for greater speed for manipulating data and for holding larger amounts of data. To meet these demands for increased performance, the mechanical assembly in an HDD has undergone many changes.

Vibration can limit the performance of an HDD, and if uncontrolled can render an HDD inoperable. Mitigating vibration in an HDD will allow an HDD to write more data tracks on a disk surface. Controlling vibration in an HDD will also allow the subassemblies in an HDD to settle on these data tracks more quickly and allow faster writing and retrieval of data.

Presently, vibration absorbent materials or extraneous systems such as shock absorbers and active vibration control systems with feedback loops are often used to reduce vibration. However, such methods and systems are usually cost prohibitive and significantly impact manufacturing time and complexity.

SUMMARY

Methods for reducing oscillation at the read write element of a hard disk drive, are described. In one embodiment, a flex cable for conducting data signals from a head stack assembly to a connector is provided. One or more weights are then coupled with the flex cable at one or more predetermined locations. The one or more predetermined locations are selected based upon mass distribution along the flex cable.

The drawings referred to in this description should be understood as not being drawn to scale except if specifically noted.

DETAILED DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview

Embodiments of the present technology minimize oscillation at the read write element of a hard disk drive, thus enabling a hard disk drive to settle on targeted data tracks more quickly and allow faster writing and retrieval of data. Internal mechanical operations and external applied forces cause the flex cable to oscillate. Flex cable oscillation contributes to internal HDD vibrations, thus causing the read write element to also oscillate.

The present technology couples one or more weights with a flex cable in order to re-distribute mass along the longitudinal direction of the flex circuit. Re-distributing the mass along the flex circuit causes the modal shapes of the flex cable structure (FCS) to change while the FCS conducts data signals. A change in the rate of flex cable oscillation accompanies changes in modal shapes. If flex cable oscillation is reduced, the read write element coupled with the flex cable also experiences a reduction in oscillation, thus enabling a smoother and quicker settling on a targeted track.

Operation

Figure 1:
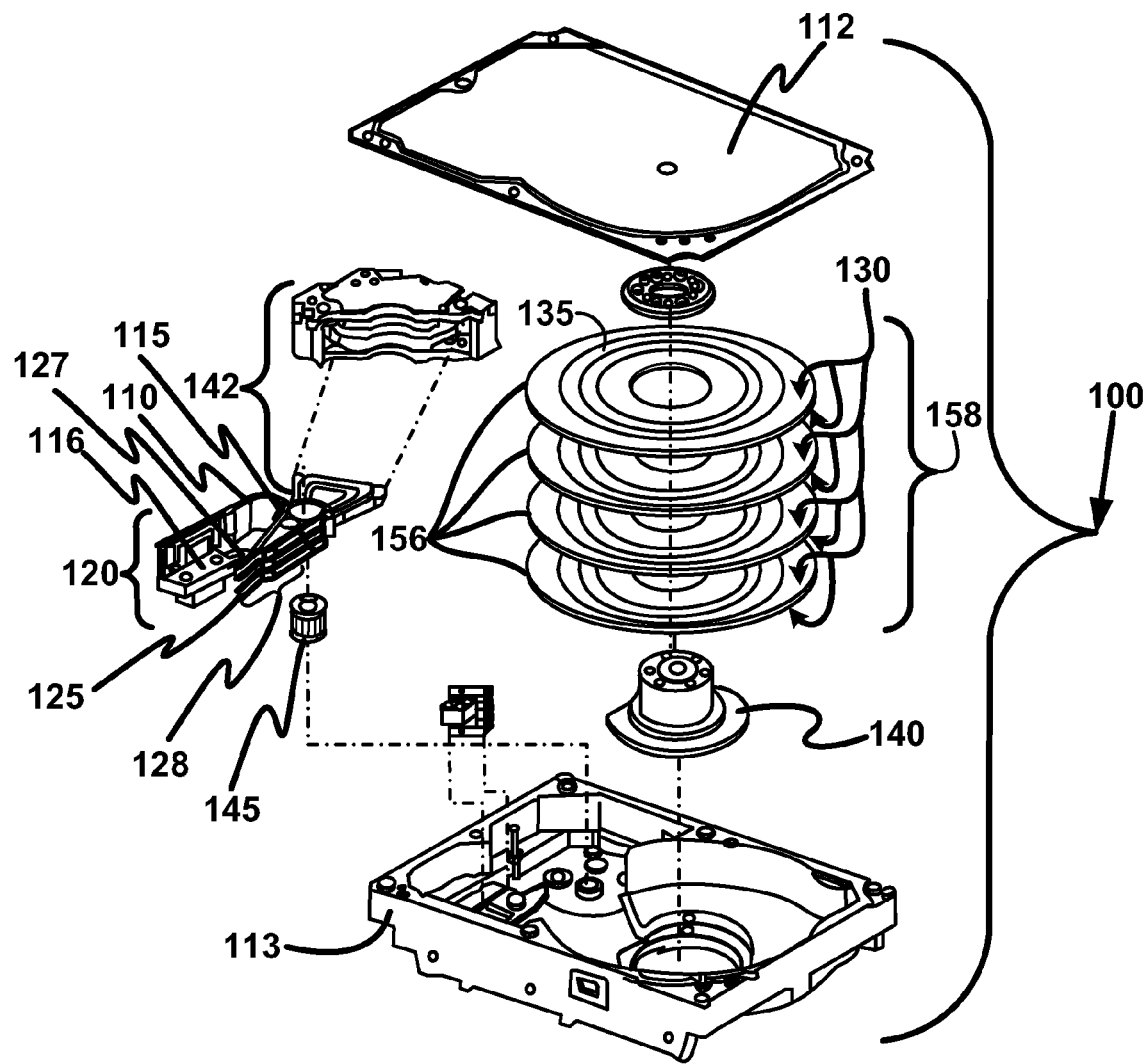
FIG. 1 is an isometric blow-apart of an HDD in accordance with one embodiment of the present technology

With reference to FIG. 1, an isometric blow-apart of HDD 100 is shown in accordance with an embodiment of the present invention. Base casting 113 provides coupling points for components and subassemblies such as disk stack 158, voice coil motor (VCM) 142, and HSA 120. Disk stack 158 is coupled with base casting 113 by means of motor-hub assembly 140. Motor-hub assembly 140 will have at least one disk 156 coupled with it such that disk 156 can rotate about an axis common to motor-hub assembly 140 and the center of disk 156. Disk 156 has at least one disk surface 130 upon which reside data track 135. HSA 120, referred to as an actuator when coupled with pivot bearing 145, comprises suspension 127, which suspends hard disk drive slider 125 next to disk surface 130, and connector 116, which conveys data between A/E module 115 and a host system wherein HDD 100 resides. Suspension 127 and hard disk drive slider 125 comprise head gimbal assembly (HGA) 128. Flex cable 110, which is part of HSA 120, conveys data between connector 116 and HSA 120.

HSA 120 is coupled pivotally with base casting 113 by means of pivot bearing 145, such that VCM 142 can move HGA 128 with slider 125 arcuately across disk surface 130. Upon assembly of HSA 120, disk stack 158, VCM 142, and other components with base casting 113, cover 112 is coupled with base casting 113 to enclose these components and subassemblies into HDD 100.

Figure 2:
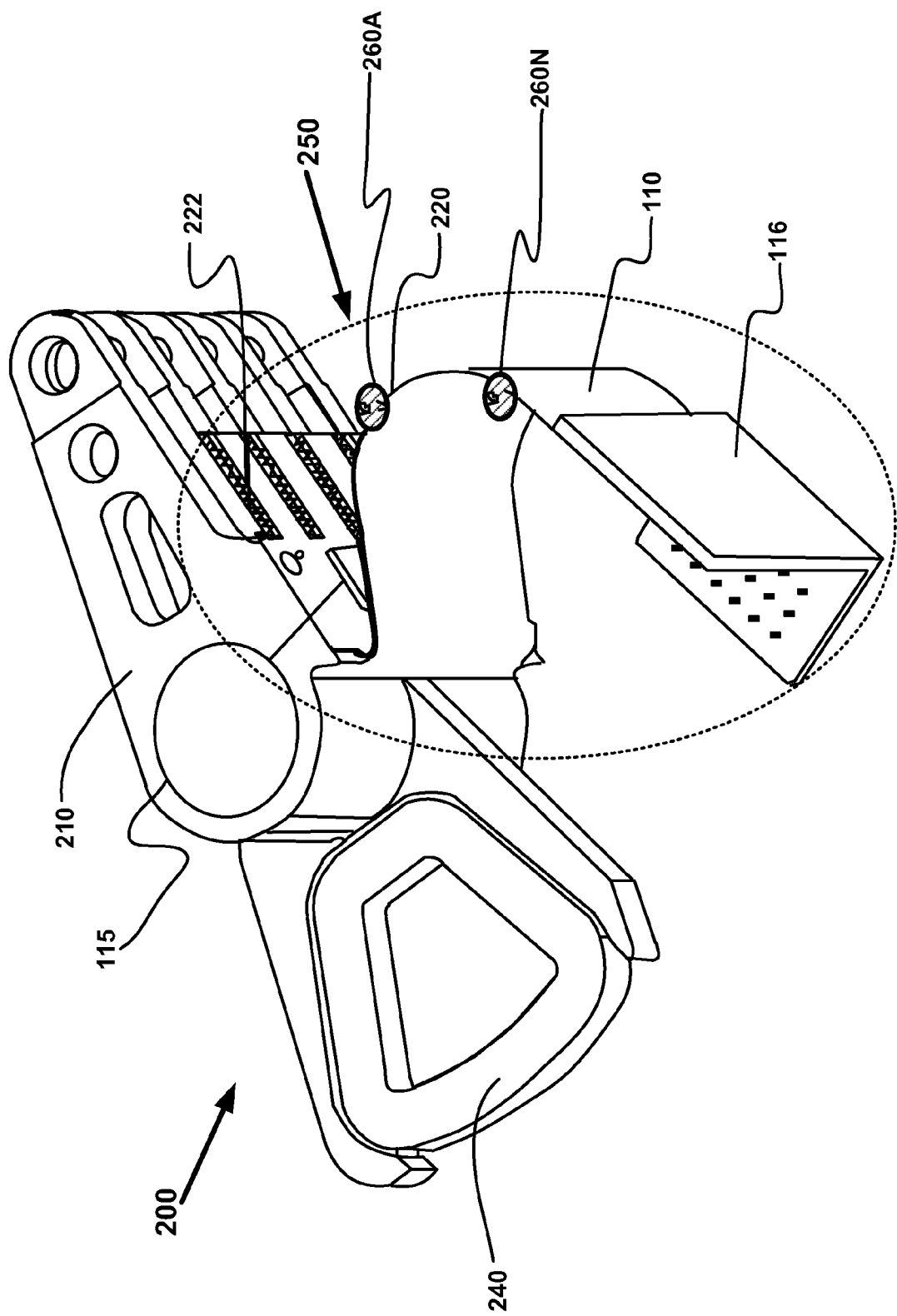
FIG. 2 is an isometric schematic of a comb assembly in accordance with one embodiment of the present invention.
Figure 3:
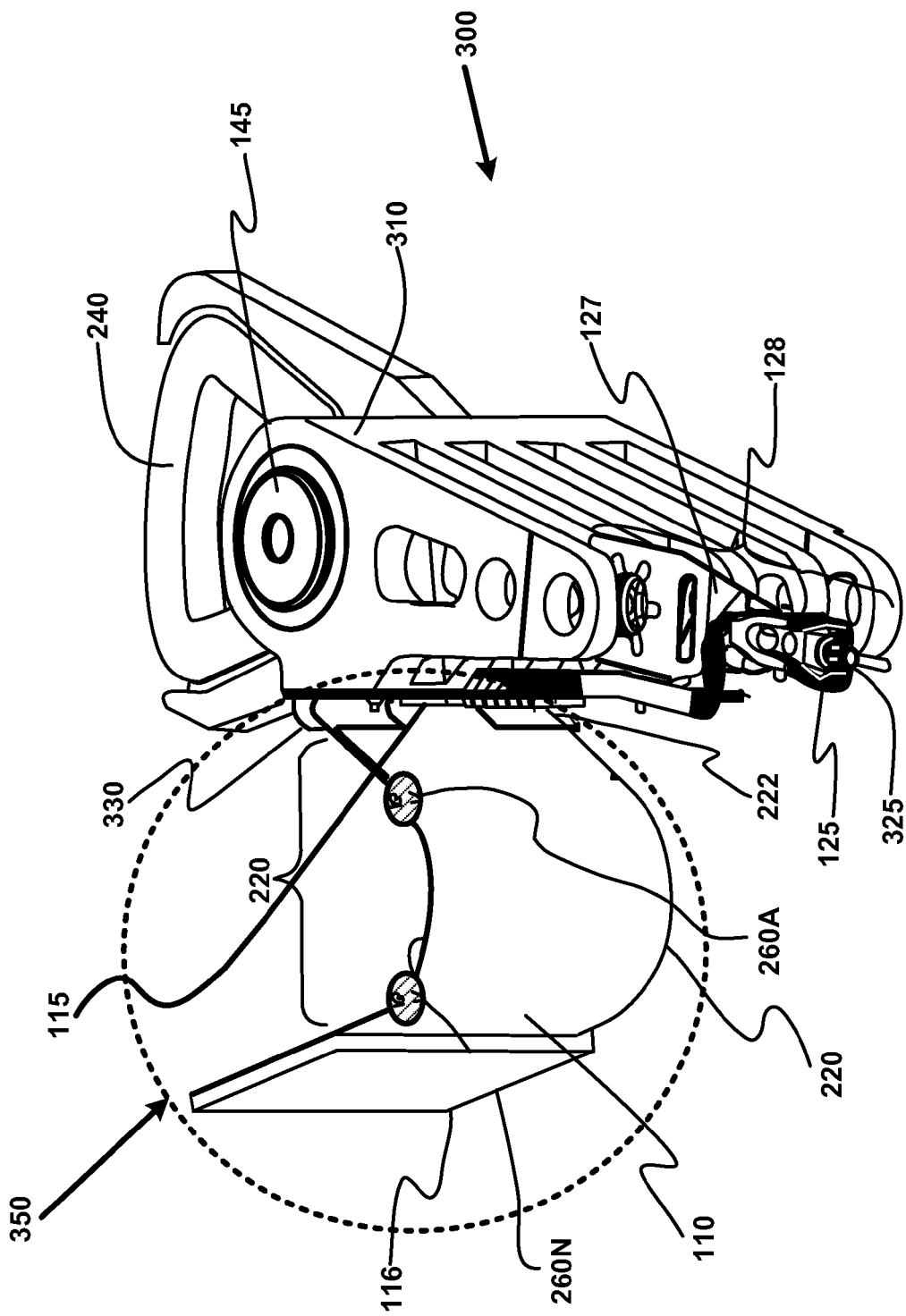
FIG. 3 is an isometric schematic of a comb assembly in accordance with one embodiment of the present invention.

With reference to FIG. 2, an isometric schematic of a comb assembly 200 is shown in accordance with one embodiment of the present invention. Referring now to FIG. 2 and FIG. 3, the hierarchy of assemblies and subassemblies is defined as follows: flex cable assembly 250, 350 is a subassembly, which can be coupled with comb 210.

Comb assembly 200 is a subassembly that is operable to receive at least one HGA 128. In general, comb assembly 200 comprises, comb 210, voice coil 240, and flex cable assembly 250, 350. Coupling at least one HGA 128 with comb assembly 200 comprises HAS 120. Coupling pivot-bearing 145 with HAS 120 comprises actuator 300 of FIG. 3. When coupled with HAS 120 and pivot bearing 145, comb assembly 200 is operable to arcuately move magnetic transducer 325 (FIG. 3) across data tracks 135 in HDD 100. Additionally, in accordance with an embodiment of the present invention, flex cable assembly 250 and 350 further comprise one or more weight assemblies 260A and 260N coupled with dynamic loop section 220 at one or more locations to reduce flex cable oscillation.

It should be appreciated that weight assemblies 260A and 260N represent any number of weight assemblies capable of being located on flex cable 110, in accordance with embodiments of the present technology. The phrase 'any number of weight assemblies' refers to any number of weight assemblies equal to or greater than one weight assembly.

With reference to FIG. 3, an isometric schematic of actuator 300 is shown in accordance with one embodiment of the present invention. Many of the elements of FIG. 3 are also presented in FIG. 1. For the sake of clarity, they are presented in more detail in FIG. 3. In general, actuator 300 comprises HSA 120, which comprises comb assembly 200, which comprises flex cable assembly 350.

Actuator 300 without pivot bearing 145 comprises HSA 120. HSA 120 comprises at least one HGA 128 coupled with comb 210. For the sake of brevity and clarity, one HGA 128 is presented in FIG. 3. However, the present technology is well suited to a plurality of HGAs can be added to comb 210 without detracting from spirit and scope. HGA 128 comprises suspension 127 and slider 125, wherein magnetic transducer 325 is coupled. Magnetic transducer 325 reads and writes data tracks 135 onto surface 130 of disk 156. Pivot bearing 145 is coupled with HSA 120 and to base casting 113 thus allowing HSA 120 to move magnetic transducer 325 arcuately across data tracks 135.

As HSA 120 is actuated by VCM 142, HSA 120 is excited to vibrate with varying modes of vibration. These modes of vibration are in part the result of interactions of: torque generated by VCM 142; the overall stiffness and localized stiffness of HSA 120; the overall mass and localized mass of HSA 120; and the speed and frequency at which torque is applied and redirected.

When referring to localized mass and localized stiffness, HSA 120 can be viewed as a series of masses comprising slider 125, suspension 127, comb (210, 310), flex cable 110, and voice coil 240. There exist several other localized masses that for the sake of brevity and clarity are not presented here. The portions of HSA 120 that connect the localized masses have intrinsic stiffness or springiness.

There are several sources for vibration energy that act on actuator 300. Of particular interest to the performance of an HDD and to embodiments of the present invention are vibration of flex cable 110, which impart motion and vibration into actuator 300. Dynamic loop section 220 of flex cable 110 is required for proper arcuate movement of actuator 300.

Referring now to FIGS. 1, 2, and 3, in one embodiment, flex cable assembly 250, 350 has flex cable 110 for conducting data signals from HSA 120 to connector 116, wherein flex cable 110 has a dynamic loop section 220 between a termination for HSA 120 and connector 116.

Figure 4:
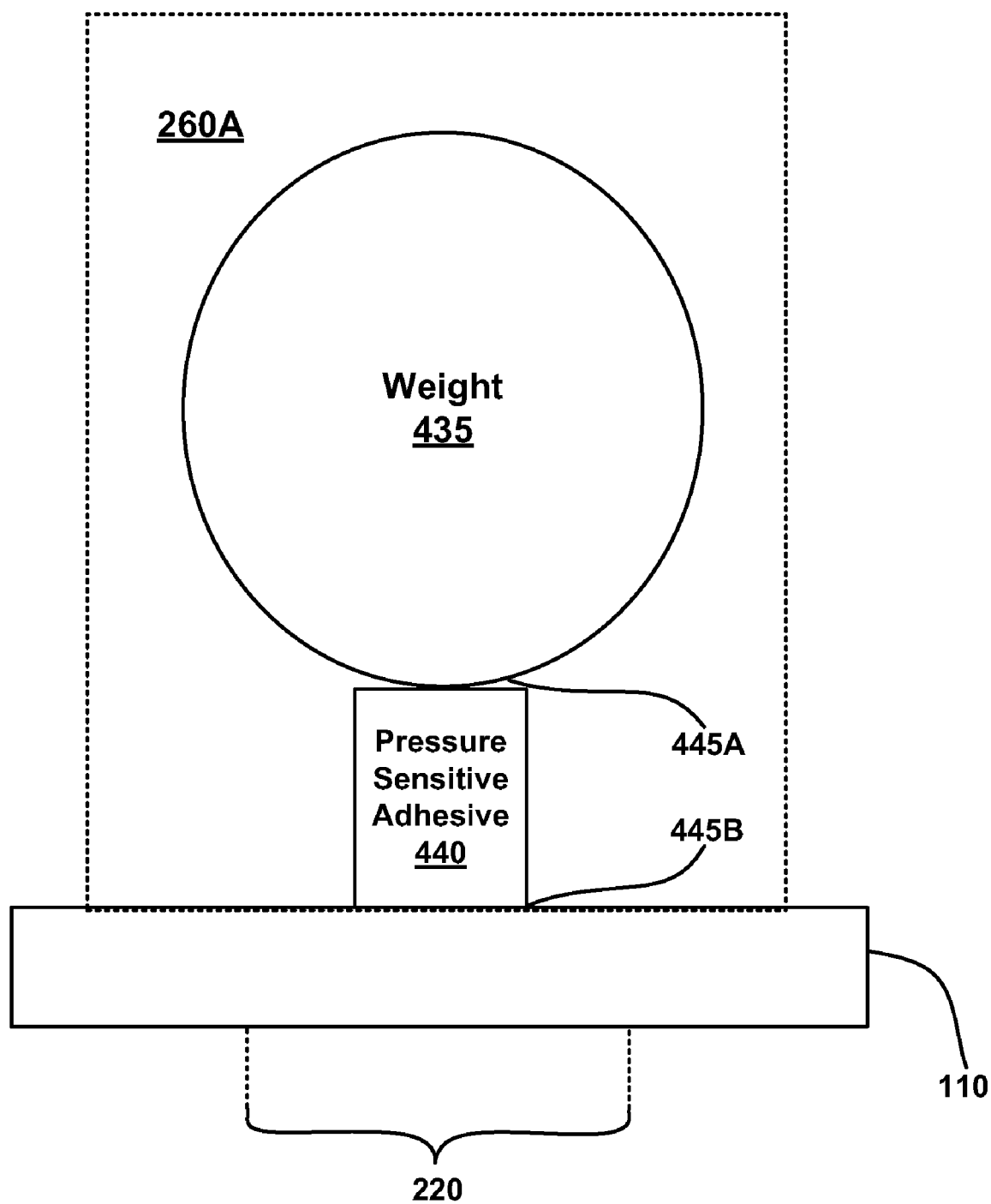
FIG. 4 is a block diagram of a weight assembly coupled with a dynamic loop section of a flex cable.

With reference now to FIG. 4, a block diagram of an example weight assembly 260A in accordance with one embodiment of the present technology is shown. In one embodiment, weight assembly 260A includes weight 435 and pressure sensitive adhesive 440. Weight assembly 260A is coupled with flex cable 110.

Weight 435 may be any weight compatible with being coupled with flex cable 110, while not disrupting HDD 100 operations. For example, a weight of 15 milligrams would be a weight that is compatible with being coupled with flex cable 110. However, a weight of 1 kilogram might disrupt HDD 100 operations. A weight capable of being coupled with flex cable 110 may be dependent upon the strength of HDD 100 components. For example, a weight that is too light might not have enough inertia to change the modal shape of the FCS. Moreover, HDD 100 components might not be able to support a weight that is too heavy.

Additionally, weight 435 may be composed of any matter that is compatible with operations involving conducting data signals over dynamic loop section 220. For example, a weight 435 composed of, but not limited to, copper and/or aluminum would be matter that has conductive properties and is compatible with conducting data signals over dynamic loop section 220.

With reference again to FIG. 4, in one embodiment, weight 435 is coupled with a first surface 445A of pressure sensitive adhesive 440, and a second surface 445B of pressure sensitive adhesive 440 is coupled with dynamic loop section 220.

Pressure sensitive adhesive 440 may be coupled to any portion of dynamic loop section 220. Additionally, more than one pressure sensitive adhesives 440 may be coupled with dynamic loop section 220. For example, three weight assemblies are coupled with dynamic loop section 220 via a separate pressure sensitive adhesive 440 for each weight assembly. Thus, for each of the three weight assemblies there is a pressure sensitive adhesive 440 coupled with each weight assembly and coupled with dynamic loop section 220.

Of course, there may be more than one pressure sensitive adhesive 440. Additionally, not every pressure sensitive adhesive 440 must be coupled with one or more weights 435. For example, while a first pressure sensitive adhesive 440 and a second pressure sensitive adhesive 440 may be coupled with more than one weight 435 and dynamic loop section 220, a third pressure sensitive adhesive 440 may be coupled with dynamic loop section 220 as well as matter other than weight 435 that is compatible within the HDD 100 environment. This matter may operate with weight assembly 260A to reduce oscillations and/or operate to perform a function unrelated to reducing oscillations.

In one embodiment, flex cable assembly 250, 350 includes a damping layer as the pressure sensitive adhesive 440. The entire pressure sensitive adhesive 440 may be a damping layer, or a portion of the pressure sensitive adhesive 440 may be a damping layer.

The damping layer is a damper designed to primarily reduce the gain of the frequency of vibration. In general, a damper reduces the gain of a vibration and attenuates the frequency of vibration by absorbing the energy of vibration.

Some examples of damping layers are selected from the group of damping layer materials including: acrylic adhesive, LA-50/100, ISD-110, ISD-120, ISD-142, and KAPTON. These materials are examples of viscoelastic damping layer materials and are characterized by a property known as lossiness.

Lossiness is a characteristic of a material to attenuate oscillations and/or vibrations. Lossiness is a material's resistance to cyclic motion. Its compatibility in the environment of HDD 100 and its manufacturability are considered when choosing a suitable viscoelastic damping layer material.

In one embodiment, each weight assembly 160A and 160N within the flex cable system has the same measurement. Additionally, each weight assembly 160A and 160N may have slightly different weights 435 but also have slightly different damping layers such that the weight assembly 160A and 160N are the same measurement.

For example, weight assembly 160A has weight 435, which measures 5 milligrams, and pressure sensitive adhesive 440, which measures 1 milligram. Weight assembly 160B has weight 435, which measures 4 milligrams, and pressure sensitive adhesive 440, which measures 2 milligrams. Weight assembly 160C has weight 435, which measures 4.5 milligrams, and pressure sensitive adhesive 440, which measures 1.5 milligrams. Even though the components of weight assemblies 160A, 160B, and 160C are of different measurements, weight assemblies 160A, 160B, and 160C have the same measurement of 6 milligrams.

In another embodiment, each weight assembly 160A and 160N of a first portion of a set of the one or more weight assemblies 160A and 160N has the same measurement. Additionally, each weight assembly 160A and 160N of a second portion of the set of the one or more weight assemblies 160A and 160N has a different measurement.

For example, a set of one or more weight assemblies 160A and 160N is 160A, 160B, 160C, 160D, 160E, 160F, 160G, 160H, and 160I. A first portion of this set is the following: 160A, 160B, 160C, 160D, 160E, and 160F. All of the weight assemblies of the first set have the same measurement. For example, all of the weight assemblies of the first set have the weight of 5 milligrams. However, a second portion of this set is the following: 160G, 160H, and 160I.

In another embodiment, each weight assembly of the one or more weight assemblies 160A and 160N has a different measurement. For example, out of the following weight assemblies, 160A, 160B, and 160C, weight assembly 160A is 2 milligrams, weight assembly 160B is 3 milligrams, and weight assembly 160C is 4 milligrams.

Thus, by utilizing weight assembly 260A coupled with flex cable 110, embodiments of the present technology provide a method for re-distributing mass along the flex cable. This mass re-distribution alters modal shapes along flex cable 110. In some cases, a reduction in oscillation accompanies this change in modal shapes. Reducing oscillation at flex cable 110 results in reduced oscillation at the read write element.

Figure 5:
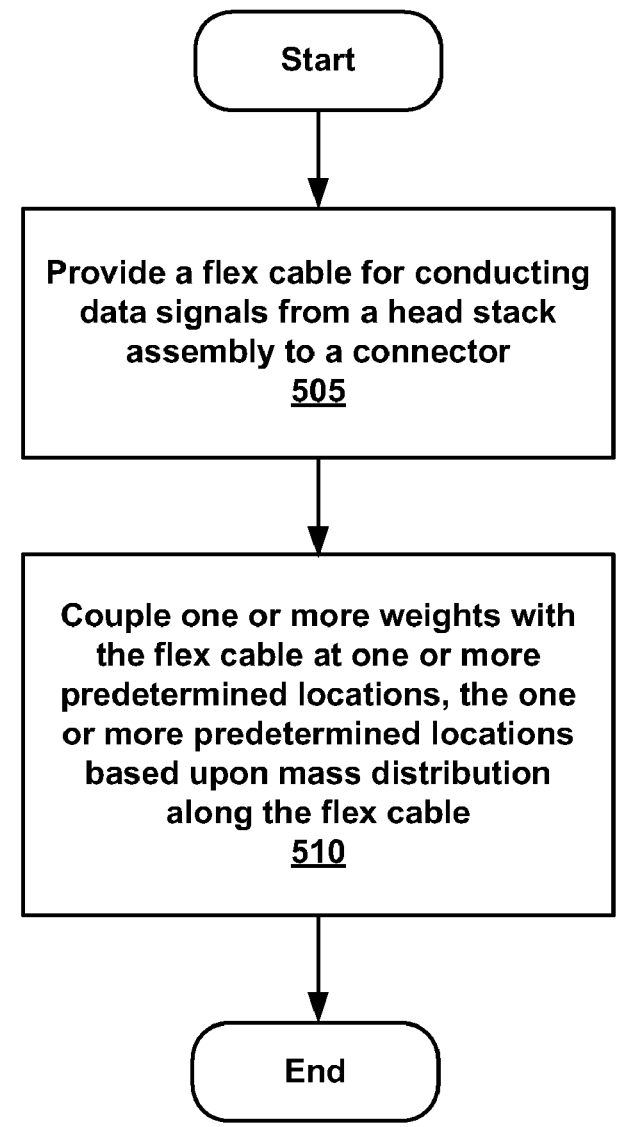
FIG. 5 is a flowchart of an example method of reducing oscillation at the read write element of a hard disk drive.

With reference now to FIG. 5, a flowchart of an example method 400 of reducing oscillation at the read write element of a HDD is shown, in accordance with an embodiment of the present technology. In accordance with an embodiment of the present technology, method 500 can be performed at any level of assembly, e.g. flex cable 110, flex cable assembly 250, 350, comb assembly 200, HSA 120, and actuator 300.

In one embodiment, process 500 is in the form of a computer readable and computer executable instructions residing, for example, in data storage features such as computer usable medium.

Referring now to 505 of Figure, one embodiment provides flex cable 110 for conducting data signals from HSA 120 to connector 116. Flex cable 110 may be an individual flex cable component or coupled with an assembly such as, flex cable assembly 250, 350, comb assembly 200, HSA 120, and actuator 300.

Referring now to 510 of FIG. 5, one embodiment couples one or more weight assemblies 260A and 260N with flex cable 110 at one or more predetermined locations, wherein the one or more predetermined locations is based upon mass distribution along flex cable 110.

In one embodiment, a first surface 445A of pressure sensitive adhesive 440 is coupled with each of the one or more weights 435. A second surface 445B of pressure sensitive adhesive 440 is coupled with flex cable 110. Moreover, second surface 445B of pressure sensitive adhesive 440 is coupled with dynamic loop section 220 of flex cable 110, wherein dynamic loop section 220 is between a termination for HAS 120 and connector 116.

In one embodiment, the second surface 445B of pressure sensitive adhesive 440 is coupled with dynamic loop section 220 of flex cable 110, wherein dynamic loop section 220 is between a termination for HSA 120 and connector 116.

In one embodiment, the location on flex cable 110, and more specifically dynamic loop section 220, of weight assemblies 260A and 260N is selected based upon an expected result. For example, at some point in time, a real-time test is performed in which weight assemblies 260A and 260N are located on flex cable 110 while data signals are conducted from HSA 120 to connector 116.

For example, weight assembly 260A is coupled to flex cable 110 at point A. Weight assembly 260N is coupled to flex cable 110 at point B. Data signals may then be conducted from HSA 120 to connector 116. The rate of oscillation of dynamic loop section 220 is observed. For example, it may be observed that a certain location of weight assemblies 260A and 260N renders a reduced oscillation frequency of dynamic loop section 220.

In another embodiment of the present technology, computer simulated tests are run in order to determine the placement of weight assemblies 260A and 260N on dynamic loop section 220.

In one embodiment, the location on flex cable 110 of weight 435 is determined according to a modal shape of dynamic loop section 220. For example, a certain modal shape of dynamic loop section 220 may be known to create a specific and desired oscillation frequency. Force is applied by weight 435 coupled with dynamic loop section 220 at a certain location in order to create the desired and known modal shape of dynamic loop section 220 during operation.

In yet another embodiment, the location of the one or more weights 435 on flex cable 110 is determined based on a modal shape of dynamic loop section 220. Additionally, a location of the one or more weights 435 on flex cable 110 may be determined based upon a rate of oscillation of dynamic loop section 220. For example, the best location for weight assemblies 260A and 260N may be determined based on the excitation spectrum for dynamic loop section 220.

Thus, the present technology provides a method of reducing oscillation at the read write element of a HDD. This method includes providing a flex cable 110 for conducting data signals from HSA 120 to connector 116. Then, one or more weights 435 are coupled with flex cable 110 at one or more predetermined locations. These one or more predetermined locations are selected based upon the mass distribution along flex cable 110. Embodiments of the present technology reduce oscillation at the flex cable by re-distributing the mass along the flex cable structure. By reducing oscillation at the flex cable, oscillation is also reduced at the read write element, enabling quicker settling on target tracks.

Although the subject matter has been described in a language specific to structural features, it is to be understood that the subject matter defined in the appended claims is not necessarily limited to the specific features or acts described above. Rather, the specific features and acts described above are disclosed as example forms of implementing the claims.

What is claimed is:

1. A flex cable assembly comprising:
   a flex cable for conducting data signals from a head stack assembly to a connector, said flex cable having a dynamic loop section between a termination for said head stack assembly and said connector, said dynamic loop section comprising:

a top and bottom edge;
a first side coupled with said termination for said head stack assembly; and
a second side coupled with said connector;
one or more weight assemblies coupled with said dynamic loop section of said flex cable at a location to reduce flex cable oscillation, each of said weight assemblies comprising:
a weight coupled with a first surface of a pressure sensitive adhesive; and
a second surface of said pressure sensitive adhesive coupled with said dynamic loop, wherein said pressure sensitive adhesive is a damping layer and is positioned along at least one of said top edge and bottom edge of said dynamic loop section such that said one or more weight assemblies coupled with said dynamic loop section re-distributes mass along said flex cable.

2. The flex cable assembly of claim 1, wherein said damping layer is selected from the group of damping layer materials consisting of:
acrylic adhesive, LA-50/100, ISD-110, ISD-120, ISD-142, and KAPTON.

3. The flex cable assembly of claim 1, wherein each weight assembly of said one or more weight assemblies has a same measurement.

4. The flex cable assembly of claim 1, wherein each weight assembly of a first portion of a set of said one or more weight assemblies has a same measurement, and each weight assembly of a second portion of said set of said one or more weight assemblies has a different measurement.

5. The flex cable assembly of claim 1, wherein each weight assembly of said one or more weight assemblies has a different measurement.

6. A hard disk drive comprising:
a flex cable for conducting data signals from a head stack assembly to a connector, said flex cable having a dynamic loop section between a termination of said head stack assembly and said connector, said dynamic loop section comprising:
a top and bottom edge;
a first side coupled with said termination for said head stack assembly; and
a second side coupled with said connector; and
one or more weight assemblies coupled with said dynamic loop section of said flex cable at a location to distribute mass of said flex cable, each of said one or more weight assemblies comprising:
a weight coupled with a first surface of a pressure sensitive adhesive; and
a second surface of said pressure sensitive adhesive coupled with said dynamic loop section, wherein said pressure sensitive adhesive is a damping layer and is positioned along at least one of said top edge and bottom edge of said dynamic loop section such that said one or more weight assemblies coupled with said dynamic loop section re-distributes mass along said flex cable.

7. The hard disk drive of claim 6, wherein said damping layer is selected from the group of damping layer materials consisting of:
acrylic adhesive, LA-50/100, ISD-110, ISD-120, ISD-142, and KAPTON.

8. The hard disk drive of claim 6, wherein each weight assembly of said one or more weights has a same measurement.

9. The hard disk drive of claim 6, wherein each weight assembly of a first portion of a set of said one or more weight assemblies has a same measurement, and each weight assembly of said set of a second portion of said one or more weight assemblies has a different measurement.

10. The hard disk drive of claim 6, wherein each weight assembly of said one or more weight assemblies has a different measurement.

11. A method of reducing oscillation at a read write element of a hard disk drive, said method comprising;
providing a flex cable for conducting data signals from a head stack assembly to a connector, said flex cable having a dynamic loop section between a termination for said head stack assembly and said connector, said dynamic loop section comprising:
a top and bottom edge;
a first side coupled with said termination for said head stack assembly; and
a second side coupled with said connector; and
coupling one or more weights with said flex cable, via a pressure sensitive adhesive at one or more predetermined locations along said at least one of said top edge and said bottom edge of said dynamic loop section, said pressure sensitive adhesive being a damping layer, said one or more predetermined locations selected based upon mass distribution along said flex cable.

12. The method of claim 11, further comprising:
coupling a first surface of said pressure sensitive adhesive with each of said one or more weights; and
coupling a second surface of said pressure sensitive adhesive with said dynamic loop section of said flex cable.

13. The method of claim 11, wherein said damping layer is selected from the group of damping layer materials consisting of:
acrylic adhesive, LA-50/100, ISD-110, ISD-120, ISD-142, and KAPTON.

14. The method of claim 11, further comprising:
determining said location on said flex cable of said one or more weights according to a modal shape of said dynamic loop section.

15. The method of claim 11, further comprising:
determining said location on said flex cable of said one or more weights based on a rate of oscillation of said dynamic loop section.

16. The method of claim 11, further comprising:
coupling said one or more weights with said flex cable, wherein said one or more weights have different measurements.

* * * * *